United States Patent [19]
Yoshida

[11] 4,410,956
[45] Oct. 18, 1983

[54] EXPONENTIAL OPERATION DEVICE

[75] Inventor: Junichi Yoshida, Tachikawa, Japan

[73] Assignee: Casio Computer Co., Ltd., Tokyo, Japan

[21] Appl. No.: 249,187

[22] Filed: Mar. 30, 1981

[30] Foreign Application Priority Data

Apr. 15, 1980 [JP] Japan .................................. 55-50091

[51] Int. Cl.³ ............................................ G06F 7/552
[52] U.S. Cl. ...................................... 364/752; 364/753
[58] Field of Search ............... 364/752, 753, 813, 814; 328/144

[56] References Cited

U.S. PATENT DOCUMENTS

4,158,889  6/1979  Monden ............................ 364/753
4,225,933  9/1980  Monden ............................ 364/753
4,298,951  11/1981  Hall .................................... 364/752

Primary Examiner—David H. Malzahn
Attorney, Agent, or Firm—Frishauf, Holtz, Goodman & Woodward

[57] ABSTRACT

An exponential operation device comprises an exponential operation circuit for carrying out the exponential operation of a term $x^y$ formed of data x and data y; and an operation circuit for judging whether the data x supplied by key depression denotes a positive or negative value, and also whether or not the data y supplied similarly by key depression is an integer. Where the operation circuit judges that the data x denotes a negative value and the data y is an integer, then the exponential operation circuit carries out the exponential operation of the term $x^y$, thereby providing an answer even when the data x denotes a negative value.

11 Claims, 7 Drawing Figures

EXPONENTIAL OPERATION DEVICE

BACKGROUND OF THE INVENTION

This invention relates to an exponential operation device which carries out an exponential operation of $x^y$ or $x^{1/y}$ related to a negative number x and can provide an answer. A compact electronic calculator for counting functions can generally carry out an exponential operation of $x^y$ or $x^{1/y}$ related to data x and data y. Where the data x represents a negative value, and answer sometimes takes an imaginary form. In such case, an answer derived from the exponential operation of $x^y$ has hitherto been treated as an error. Where, in the exponential operation of $x^y$, data y denotes an integer, though data x represents a negative value, then an answer takes a real form. Where, in the exponential operation of $x^{1/y}$, data y denotes an odd number, then an odd root of negative x includes at least one real root. Although a real root is present, an answer sometimes takes an imaginary form as described above. Since it is impossible to obtain a uniformly fixed answer, the conventional exponential operation device has the drawback of unavoidably treating an answer derived from the exponential operation of $x^y$ as an error.

It is an object of this invention to provide an exponential operation device which the above-mentioned drawbacks accompanying the prior art exponential operation device, and can determine a real answer in exponentially operating $x^y$ when y is an integer and x is a negative number and also in exponentially operating $x^{1/y}$ when data y represents an odd number.

SUMMARY OF THE INVENTION

To attain the above-mentioned object, an exponential operation device according to the invention comprises operation means for effecting a calculation on an exponential function represented by x and y; memory means for temporarily storing a radix data x and exponent data y on which an exponential calculation is to be performed, the memory means being coupled to the operation means for supplying the data x, y to the operation means; first judging means for judging whether the radix data x stored in the memory means is negative or not; second judging means for judging whether the exponent data y stored in the memory means is an integer or not; and control means coupled to the first judging means, to the second judging means and to the operation means for designating the execution of an exponential calculation, $x^y$, with respect to the operation means on the basis of judgement signals from the first and second judging means.

Where the exponential operation of $x^y$ or $x^{1/y}$ provides a real number answer, though the data x represents a negative value, then an exponential operation device embodying this invention which is arranged as described above does not regard said exponential operation as an erroneous procedure, but gives an answer all the same. The present invention allows for an exponential operation without applying any particular operation circuit, thus provided an exponential operation device of simple arrangement and great practical use. Where y represents a decimal, the present invention judges whether or not a reciprocal of said decimal denotes an integer, and, in case said reciprocal is judged to be an integer, carries out an exponential operation by replacing y with 1/y. Therefore, the present invention offers the advantage of carrying out an exponential operation on data including, for example, 1/0.5 whose value represents an integer, though the denominator is expressed as a decimal.

This invention can be more fully understood from the following detailed description when taken in conjunction with the accompanying drawings.

DETAILED DESCRIPTION

Figure 1:
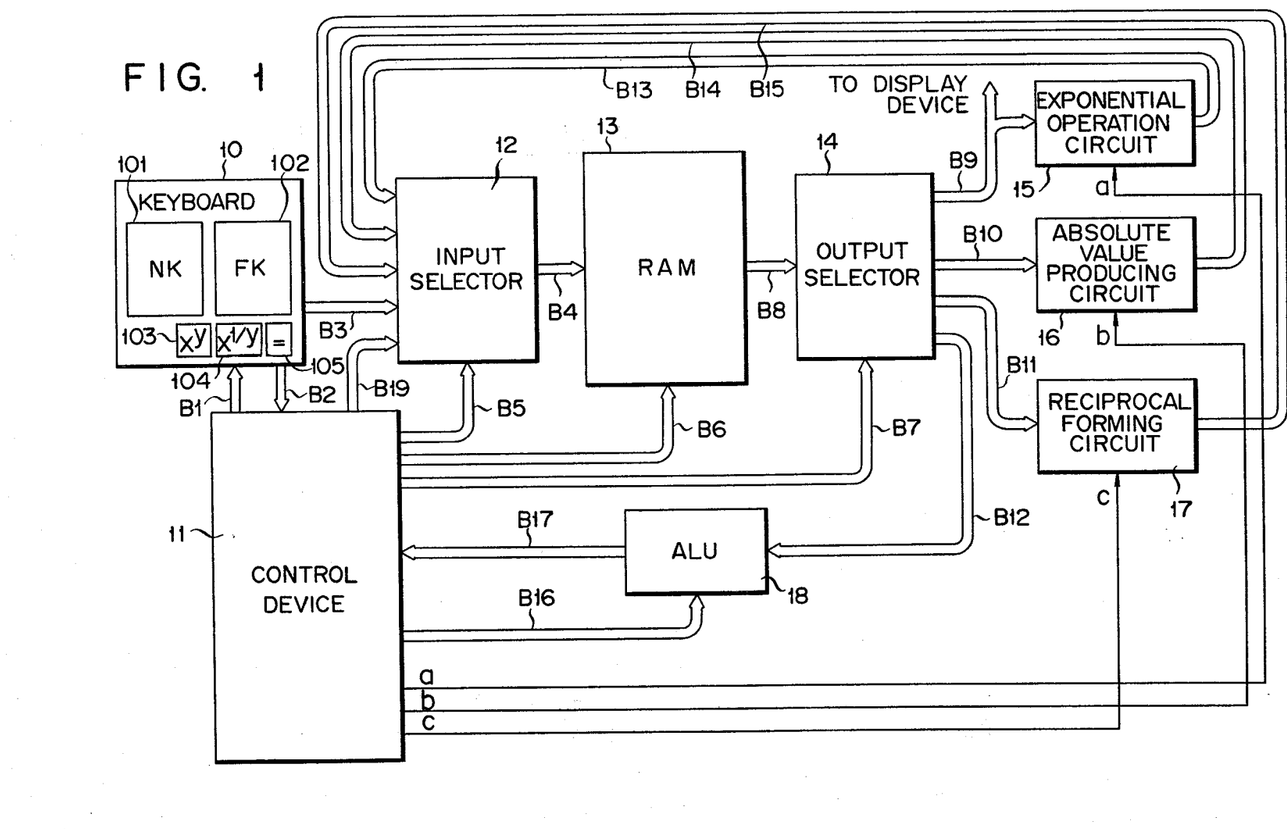
FIG. 1 is a block circuit diagram of an exponential operation device embodying this invention.

Description is now given with reference to the accompanying drawings of an exponential operation device embodying this invention. Referring to FIG. 1, reference numeral 10 denotes a keyboard provided with ten keys 101, function keys 102 representing notations such as +, −, ×, ÷, another function key 103 for exponentially determining $x^y$, another function key 104 for exponentially determining $x^{1/y}$, and equal key 105. The keyboard 10 sends forth the code of a key selectively actuated in response to a timing signal received from a control device 11 through a bus line $B_1$. The key code signal thus produced is delivered to RAM 13 through a bus line $B_3$, input selector 12, and bus line $B_4$. The input selector 12 selects from among many input signals a signal specified by a control signal supplied from the control device 11 through a bus line $B_5$ and delivers said selected signal to RAM 13. As seen from FIG. 2, RAM 13 comprises: an X register 131 for storing data X included in $x^y$ or $x^{1/y}$; a Y register 132 for storing data Y; an auxiliary Y' register 133; and F register 134 for storing an operation instruction code; a C register 135 used as a counter; and S register 136 for storing a sign flag; and an operation register (not shown).

Figure 2:
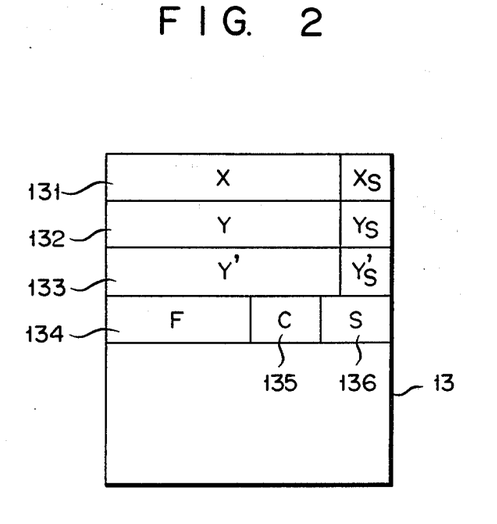
FIG. 2 illustrates the arrangement of the memory region of RAM 13 of FIG. 1.

$X_s$, $Y_s$, $Y'_s$ denote digit positions for storing a sine flag indicating a positive or negative value. A sign flag showing a negative value is represented by a binary code "1". Signals instructing the readout of data from the addresses a RAM 13 or the writing of data therein are issued from the control section 11 through a bus line $B_6$ (FIG. 1). The contents of RAM 13 are delivered to the output selector 14 through a bus line $B_8$. The output selector 14 controlled by the control section 11 through a bus line $B_7$ determines the register whose contents are to be read out, and also the member to which the read-out contents are to be supplied. An output signal from said selector 14 is conducted to an exponential operation circuit 15, absolute value-forming circuit 16, reciprocal-forming circuit 17 and operation circuit 18 through the corresponding bus lines $B_9$, $B_{10}$, $B_{11}$, $B_{12}$. The contents of the X register 131 are sent forth through the bus line $B_9$, and output selector 14 to a display section (not shown) to be indicated thereon.

When supplied with a control signal "a" from the control section 11, the exponential operation circuit 15 receives data x stored in the X register 131, data y stored in the Y register 132 and a code stored in the F register 134 and designed to instruct the exponential operation of $x^y$ or $x^{1/y}$, thereby carrying out said exponential operation. The result of said exponential operation is supplied to the X register 131 of RAM 13 through the input selector 12. When receiving a control signal "b" from the control section 11, the absolute value-forming circuit 16 forms an absolute value of a received data and sends forth said absolute value signal to a bus line $B_{14}$. When supplied with a control signal "c" from the control section 11, the reciprocal-forming circuit 17 produces a reciprocal of an input data and sends forth said reciprocal to a bus line 15. Upon receipt of a control signal from the control section 11 through a bus line $B_{16}$, the operation circuit 18 carries out various judgments as to whether an input data is an integer or decimal; a positive or negative number; and odd or even number; and also as to whether $x^y$ or $x^{1/y}$ is specified. The result of judgment is supplied to the control section 11 through a bus line $B_{17}$. The control section 11 which controls the operation of the whole of the subject exponential operation device judges a key code delivered from the keyboard 10 through a bus line $B_2$, supplies a control signal to the related circuits in accordance with said judgment, and sends forth a prescribed code signal through a bus line $B_{19}$. The control section 11 is the known microprogram control system formed of a microprogram memory device and microinstruction decoder.

Figure 3:
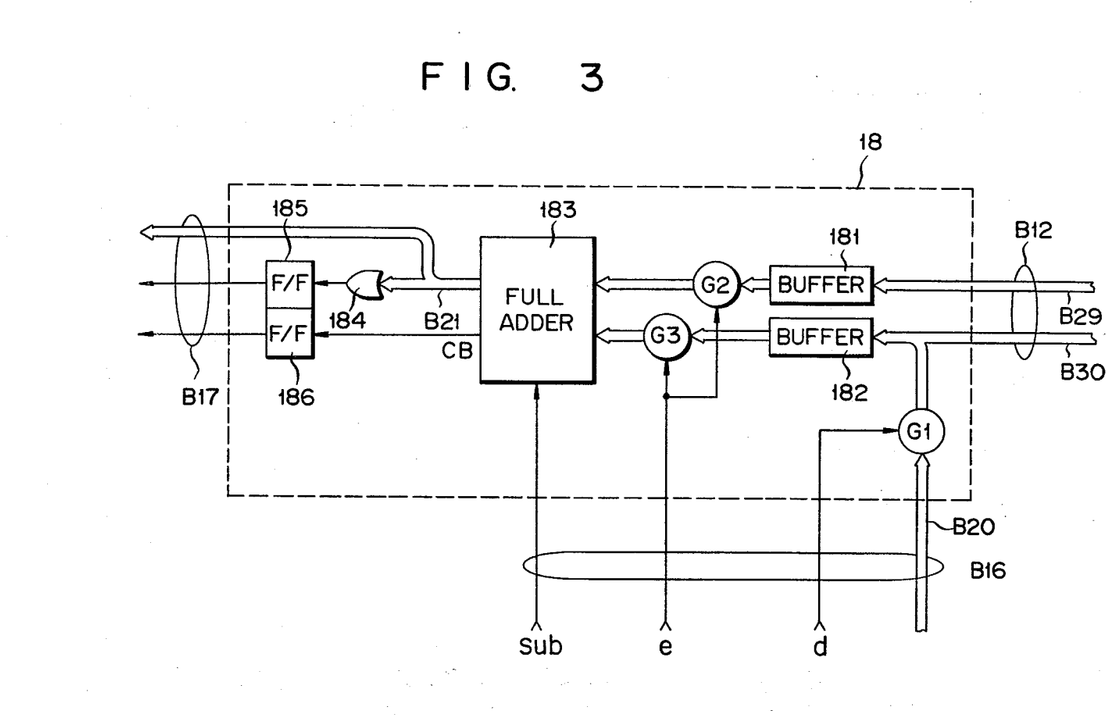
FIG. 3 shows the arrangement of the operation circuit 18 of FIG. 1.

Description is now given with reference to FIG. 3 of the arrangement of the operation circuit 18 (ALU) of FIG. 1. An operand read out of RAM 13 through the bus line $B_{12}$ is written in a buffer register 181. An operator read out of RAM 13 through the bus line $B_{12}$ is written in a buffer register 82. This buffer register 182 further receives a data delivered from the control section 11 through a bus line $B_{20}$ included in the bus line $B_{16}$ and gate $G_1$. This gate $G_1$ is opened when the control section 11 issues a control signal "d". The contents of the buffer registers 181, 182 are supplied to a full adder-substracter 183 (hereinafter referred to as "an adder") through the corresponding gates $G_2$, $G_3$. These gates $G_2$, $G_3$ are opened at the same time upon receipt of an operation instruction "e" from the control section 11. The adder 183 sums up the data of the buffer register 181 and that of the buffer register 182 or subtracts either of these data from the other. Distinction between the addition and subtraction is effected by an instruction supplied from the control section 11 through the bus line $B_{16}$. Upon receipt of a subtraction instruction Sub, the subtraction is carried out. The result of an arithmetic operation conducted by the adder 183 is supplied to a bus line $B_{21}$ and also to an OR gate 184. Where the result of an arithmetic operation delivered from the adder 183 is not represented by a binary code "0", then a signal denoting a binary code "1" is issued from the OR gate 184. This "1" signal is stored in a flip-flop circuit 185. A carry or borrow signal CB issued during the arithmetic operation of the adder 183 is stored in a flip-flop circuit 186. Output signals from the bus line $B_{21}$, and flip-flop circuits 185, 186 are supplied to the control section 11 through the bus line $B_{17}$. Various data are supplied from the control section 11 to the operation circuit 18, where subtraction is carried out between the output data from the control section 11 and the data read out of RAM 13, thereby effecting a judgment required for each case. Where an output data from RAM 13 is added, then an output data expressed by a binary code "1" is issued from the control section 11 to be attached to the data to be added. A signal showing a sum is returned to RAM 13 through the bus line $B_{17}$, control section 11, bus line $B_{19}$ input selector 12 and bus line $B_4$ in the order mentioned. Where data stored in RAM 13 is to be shifted to another area therein, then no addition data is issued from the control section 11. Said shifting is carried out through the same route as previously described, namely, through RAM 13-bus line $B_8$-output selector 14-bus line $B_{12}$-operation circuit 18-control section 11-bus line $B_{19}$-input selector 12-bus line $B_4$-back to RAM 13.

Figure 4:
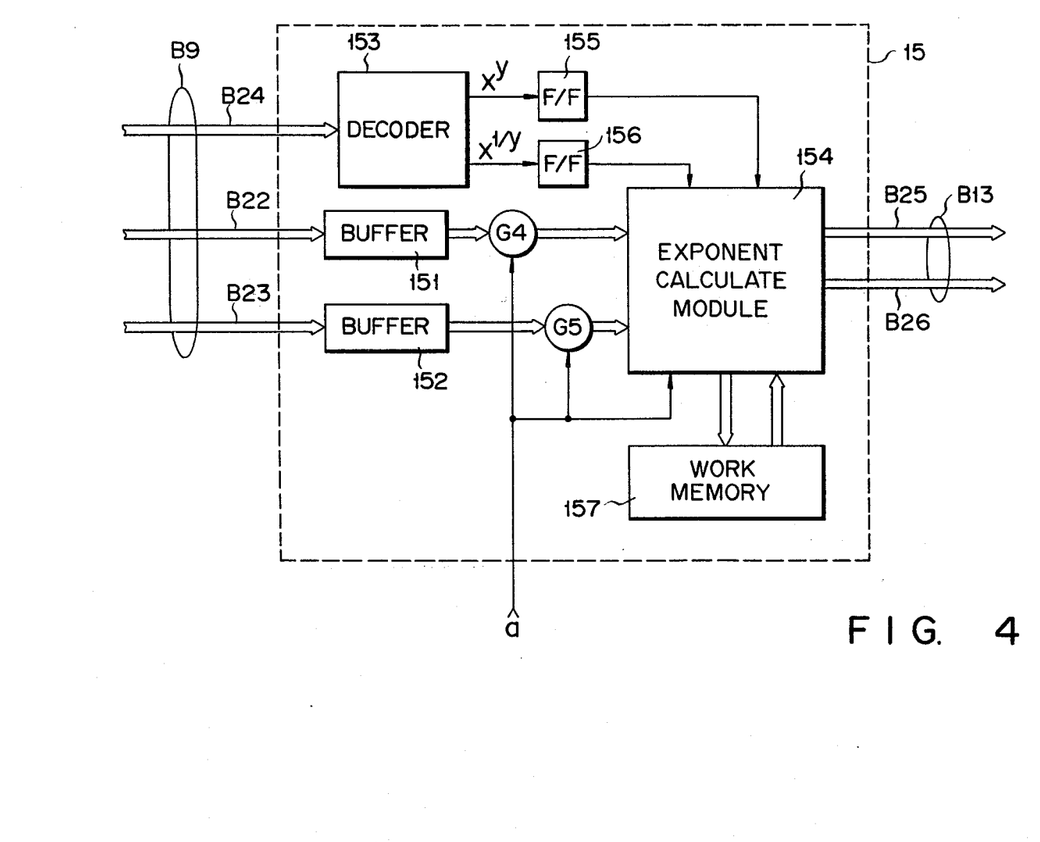
FIG. 4 illustrates the arrangement of the exponential operation circuit 15 of FIG. 1.

Description is now given with reference to FIG. 4 of the arrangement of an exponential operation circuit 15. An output data x from the X register 131 of RAM 13 is supplied to a buffer register 151 through a bus line $B_{22}$ included in the bus line $B_9$. An output data y from the Y register 132 of RAM 13 is conducted to a buffer register 152 through a bus line $B_{23}$ included in the bus line $B_9$. An output function code signal from the F register 134 of RAM 13 is delivered to a decoder 153 through a bus line $B_{24}$ included in the bus line $B_9$. The data x, y respectively stored in the buffer registers 151, 152 are supplied to an exponent calculate module 154 through gates $G_4$, $G_5$ which are opened upon receipt of the control signal a from the control section 11. The decoder 153 decodes a function code signal received through the bus line $B_{24}$. Where the function code expresses $x^y$, then a signal of a binary code "1" is supplied to a flip-flop circuit 155. Where the function code represents $x^{1/y}$, then a signal of a binary code "1" is also transmitted to a flip-flop circuit 156. When receiving a signal from the flip-flop circuit 155 and also the control signal a, then the exponent calculate module 154 calculates a value of $x^y$, while using a work memory 157. When receiving a signal from the flip-flop circuit 156 and also the control signal a, then the exponent calculate module 154 calculates a value of $x^{1/y}$. For better understanding, the exponent calculate module 154 is indicated in the form of an exponential operation microprogram converted into a module. Obviously, said exponent calculate module 154 may be formed of a microprocessor. It is also possible to calculate an exponent by the operation circuit 18 in accordance with a microprogram set in the control section 11. The exponent calculate module 154 has a function of checking errors, and, when the data x has a negative value, sends forth an error data to a bus line $B_{25}$, with the resultant answer taken as an error. Where an exponential operation is possible, then the exponent calculate module 154 sends forth the result of said exponential operation to a bus line $B_{26}$. In other words, the exponent calculate module 154 has the same function as the conventional calculator.

Figure 5:
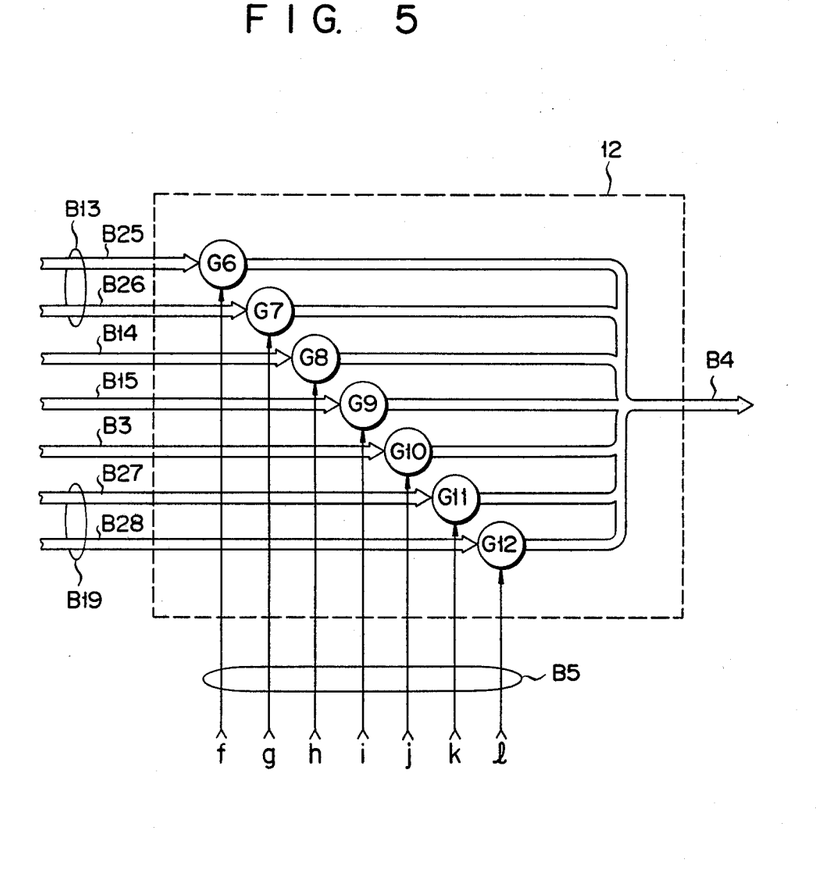
FIG. 5 sets forth the arrangement of the input selector 12 of FIG. 1.

Description is now given with reference to FIG. 5 of the arrangement of the input selector 12. This input selector 12 receives through the bus line $B_{25}$ an error signal issued during the calculation of an exponent, a signal denoting the result of an exponential operation through a bus line $B_{26}$, the absolute value of data x through the bus line $B_{14}$, the reciprocal of data y through the bus line $B_{15}$, a key code signal through a bus line $B_3$, a code signal generated in the control section 11 through a bus line $B_{27}$ included in the bus line $B_{19}$, and an output data from the operation circuit 18 through a bus line $B_{28}$ included in the bus line $B_{19}$. All the above-mentioned data are sent forth to the bus line $B_4$ through the corresponding gates $G_6$, $G_7$, $G_8$, $G_9$, $G_{10}$, $G_{11}$, $G_{12}$. These gates are opened or closed in accordance with the contents of control signals f, g, h, i. j. k. l sent forth from the control section 11 through the bus line $B_5$. The control signal "f" is issued when an error check step is taken. The control signal "g" is sent forth when the result of an exponential operation is stored in RAM 13. The control signals "h" is delivered when the absolute value of data x is stored in RAM 13. The control signal "i" is supplied when the reciprocal of data y is stored in RAM 13. The control signal "j" is produced when a key code signal is stored in RAM 13. The control signal "k" is issued when a code signal delivered from the control section 11 is stored in RAM 13. The control signal "l" is sent forth when an output data from the operation circuit 18 is stored in RAM 13.

Figure 6:
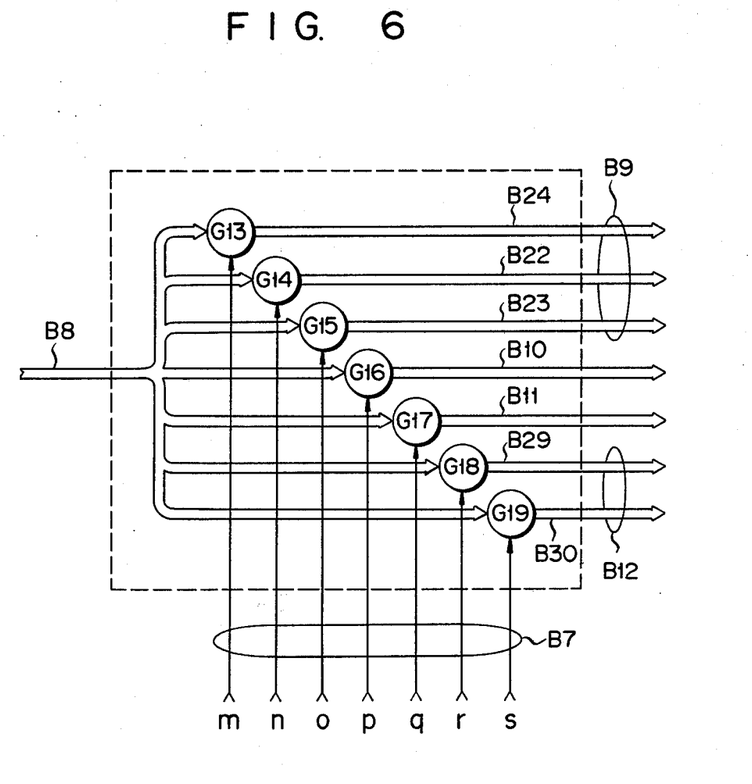
FIG. 6 shows the arrangement of the output selector 14 of FIG. 1.

Description is now given with reference to FIG. 6 of the arrangement of the output selector 14. A data read out of RAM 13 through the bus line $B_8$ is selectively supplied to the bus line $B_{24}$, $B_{22}$, $B_{23}$, $B_{10}$, $B_{11}$, $B_{29}$ or $B_{30}$ through the corresponding gate $G_{13}$, $G_{14}$, $G_{15}$, $G_{16}$, $G_{17}$, $G_{18}$ or $G_{19}$. These gates are opened or closed in accordance with the contents of control signals m, n, o, p, q, r, s issued from the control section 11 through the bus line $B_7$. The control signal m is issued when a function code signal stored in the F register 134 is read out to the exponential operation circuit 15. The control signal n is sent forth when data x stored in the X register 131 is supplied to the exponential operation circuit 15 or display section. The control signal o is produced when data y stored in the Y register 132 is conducted to the exponential operation circuit 15. The control signal p is issued when the absolute value of data x stored in the x register 13 is formed. The control signal q when the reciprocal of data y stored in the Y register 132 is formed. The control signals r, s are delivered when data stored in RAM 13 are supplied to the operation circuit 18 to judge the contents of said data, or add together said data. The control signal r is issued when data stored in RAM 13 represents an operand. The control signal s is sent forth when data stored in RAM 13 denotes an operator.

Figure 7:
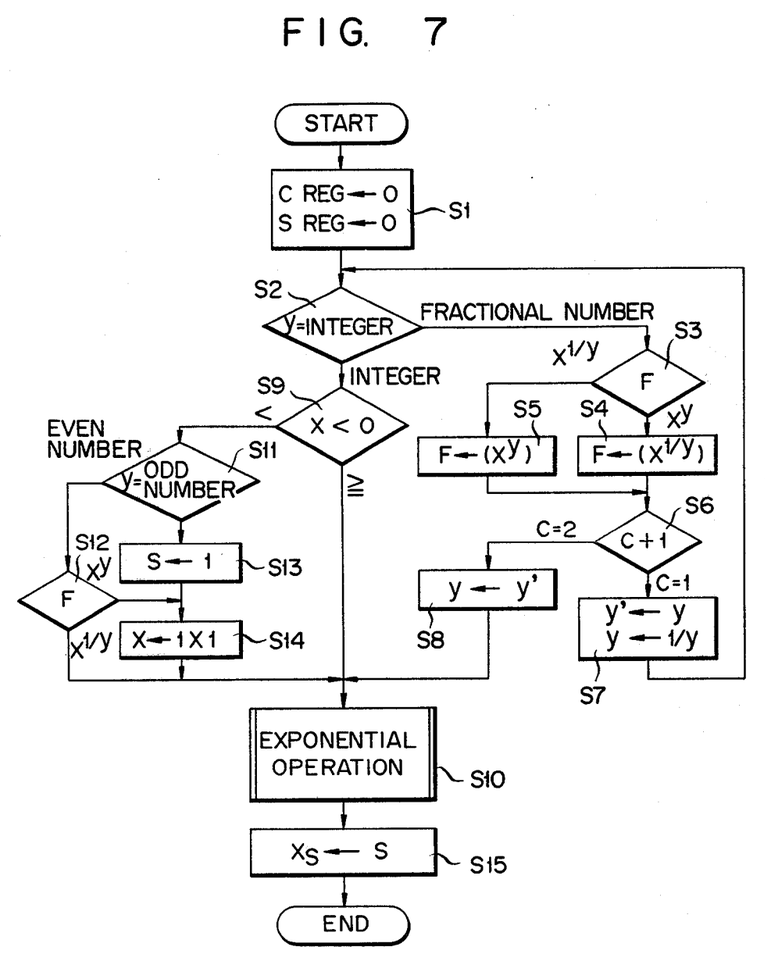
FIG. 7 is a flow chart showing the actuation of the exponential operation device of the invention.

Description is now given with reference to the flow chart of FIG. 7 of the operation of an exponential operation device embodying this invention which is arranged as described above.

When the value of $x^y$ or $x^{1/y}$ is calculated, data is first stored by operating the ten key system 101 of a keyboard 10. Then an $x^y$ key 103 or $x^{1/y}$ key 104 is actuated. The value of data y is stored by operating the ten key system 101, and thereafter an equal key 105 is operated. The value of data x delivered from the keyboard 10 is written in the X register 131 of RAM 13 through the input selector 12. At this time, the input selector 12 receives from the control section 11 a control signal j for causing a selection to be made of signals supplied from the keyboard 10. RAM 13 receives through the bus line $B_6$ a control signal for designating any of the addresses of the X register 132 and instructing the writing of data. Data y delivered from the keyboard 10 is written in the Y register 132. A code for instructing the calculation of $x^y$ or $x^{1/y}$ is stored in the F register 134. At this time, the equal key 105 is operated. The resultant signal is supplied to the control section 11 through the bus line $B_2$, thereby starting the exponential operation as shown in the flow chart of FIG. 7. At step $S_1$, the C register 135 and S register 136 of RAM 13 are cleared.

This clearing procedure is carried out with all the gates of the input selector 12 closed. Thereafter, data is written in the specified one of the addresses of RAM 13. At step $S_2$, data y stored in the Y register 132 is read out through the output selector 14 to the operation circuit 18 which judges whether data y denotes an integer larger or smaller than 1. Said operation circuit 18 judges whether data y stored in the Y register 132 is an integer larger or smaller than 1 by distinguishing between the contents of the digit position of a decimal (hereinafter referred to as "the decimal digit position") and those of the digit position of an exponent. Though the judgement procedure is already known, description is now given of the concrete procedure of judging whether, for example, the decimal digit position has such contents as can be expressed by a binary code "1" or "0". First, an address corresponding to the decimal digit position is designated. A control signal r issued from the control section 11 is supplied to the output selector 14 to open the gate $G_{18}$. As a result, the contents of the decimal digit position are supplied to the buffer register 181 included in the operation circuit 18 through the bus line $B_{29}$. The control section 11 sends forth a signal denoting a binary code "1" through the bus line $B_{20}$ included in the bus line $B_{16}$ and also a control signal d, thereby opening the gate $G_1$ of the operation circuit 18 to conduct the signal of the binary code "1" to the buffer register 182 included in the operation circuit 18. The control section 11 issues an operation instruction e and subtraction instruction Sub, causing the adder 183 to carry out the arithmetic operation of subtracting 1 from data stored in the decimal digit position. Where said subtraction shows the contents of the decimal digit position to be expressible by a binary code "1", than an output data from said adder 183 and also a borrow signal supplied from elsewhere are expressed by a binary code "0" alike. Therefore, the binary code "0" is set in the flip-flop circuits 185, 186. At this time output signals from said flip-flop circuits 185, 186 which are expressed by a binary code "0, 0" alike are supplied to the control section 11 through the bus line $B_{17}$, showing that after the above-mentioned subtraction, the contents of the decimal digit position where such as could be expressed by a binary code "1". Where the contents of the decimal digit position from which 1 has been subtracted in the adder 183 are such as can be expressed by a binary code "0", then the adder 183 issues a borrow signal, causing the flip-flop circuit 186 to be set at a condition allowing for the writing of data. Where, after the aforementioned subtraction in the adder 183, the contents of the decimal digit position are such as can be expressed by a binary code "1", then it is seen that data y is a smaller number than 1, that is, a decimal. Conversely where, the contents of the decimal digit position are such as can be expressed by a binary code "0", then data y is shown to be an integer larger than 1. However, judgment further has to be made as to whether the number of data y is actually an integer larger or smaller than 1. This judgment should be carried out by determining the contents of the digit position of an exponent (hereinafter referred to as "the exponent digit position"). At this point, however, description is omitted of the determination of the contents of said exponent digit position. Where judgment at step $S_2$ gives an integer larger than 1, then the control section 11 controls step $S_9$. Where judgment of step $S_2$ gives an integer smaller than 1, then the control section 11 controls step $S_3$. The steps following step $S_3$ is intended to determine whether there is the possibility that data y which is a decimal can be eventually converted into an integer from a reciprocal of said decimal value of data y. Namely, at step $S_3$, an operation-instructing code stored in the F register 134 is written in the operation circuit 18, which in turn judges whether the written code specifies $x^y$ or $x^{1/y}$.

Where said judgement shows that said written code specifies $x^y$, then step $S_4$ is taken. At this time, a code specifying $x^{1/y}$ is transferred from the control section 11 to the F register 134. Where said judgment shows that the written code specifies $x^{1/y}$, then step $S_5$ is taken. At this time, a code specifying $x^y$ is written in the F register 134. Thus, exchange is made between the codes instructing the exponential operations of $x^y$ and $x^{1/y}$ carried out in the F register 134.

Judgment at step $S_3$ is carried out through the same procedure as at step $S_2$. Description is now given of step $S_4$. The control section 11 sends forth a code corresponding to a function code related to $x^{1/y}$, and also a control signal k, causing said code to be written in the F register 134 of RAM 13 through the bus line $B_{27}$, gate $G_{11}$ and bus line $B_4$. At this time, RAM 13 receives from the control section 11 through the bus line $B_6$ an instruction designating any of the addresses of the F register 134 included in RAM 13 and a write instruction. The same procedure is taken at step $S_5$ as at step $S_4$.

At step $S_6$, the control section 11 specifies any of the addresses of the C register 135 of RAM 13 to which an increment instruction is given. The contents of the C register 135 are increased by 1, and the increased contents are read out to the operation circuit 18, which in turn judges said contents. At step $S_6$, the contents of the C register 135 of RAM 13 are read out. The control section 11 sends forth a binary code "1," causing addition to be carried out in the operation circuit 18. The resultant data is written in the C register 135 of RAM 13. The contents of said C register 135 are judged through the same procedure as described above. Where said contents indicate "1", then step $S_7$ is commenced. Where said contents show "2", then step $S_8$ is taken. Since the C register 135 has its contents initially cleared, step $S_7$ is taken first. At this time, data y stored in the Y register 132 is temporarily stored in the Y' register 133. Thereafter, the data y stored in the Y register 132 is read out to a reciprocal-forming circuit 17, which in turn produces the reciprocal of the data y. The reciprocal 1/y thus formed is written in the Y register 132.

The formation of a reciprocal is conducted as follows. The control section 11 sends forth a control signal q to the output selector 14. Data stored in the Y register 132 is supplied to the reciprocal-forming circuit 17 through the bus line $B_{11}$. The reciprocal-forming circuit 17 is provided with a program designed to determine the reciprocal of an input data. Upon receipt of a control signal b from the control section 11, the reciprocal 1/y of the input data y is formed. Where a control signal i is issued from the control section 11 to the input selector 12, then the reciprocal of data y is delivered to the Y register 132 of RAM 13.

Operation is returned to step $S_2$. Judgment is made as to whether the contents of the Y register 132 indicate an integer larger or smaller than 1. Where data y is converted into its reciprocal 1/y, and an operation-instructing code $x^y$ is replaced by an operation-instructing code $x^{1/y}$, then it is possible to judge whether the data y which is a decimal can be eventually changed into an integer larger than 1 by being converted into its reciprocal 1/y, because a value resulting from said replacement is equivalent to a value derived from the original operation as connected from an absolute value. Where, at step $S_2$, judgment is made as to whether the contents of the Y register 132 are an integer larger or smaller than 1, and said contents are found to indicate an integer larger than 1, then step $S_9$ is taken. Conversely where the contents of the Y register 132 still indicate an integer smaller than 1, then steps $S_3$ and $S_4$ or $S_5$ are taken, thereby returning the instruction code stored in the F register 134 to the original instruction code. At step $S_6$, the contents of the C register 135 are increased by 1, and the increased contents are judged by the operation circuit 18. Where the contents of the C register 135 indicate "2," then step $S_8$ is commenced to return the data y temporarily stored in the Y' register 133 to the Y register 132. At step $S_{10}$, an exponential operation is carried out. Where, with an exponential operation device embodying this invention, data y included in $x^y$ or $x^{1/y}$ is a decimal, and even when converted into its reciprocal, cannot be eventually converted into a regular integer, then the same procedure is taken as that which has been followed by the conventional exponential operation device. Namely, where x shows a negative value, then the embodiment of the present invention treats this case as an error.

At step $S_{10}$, a control signal n is sent forth from the control section 11 to the output selector 14 to open the gate $G_{14}$. Data x stored in the X register 131 of RAM 13 is supplied to the exponential operation circuit 15 through the bus line $B_{22}$. The control signal o is issued from the control section 11 to the output selector 14 to open the gate $G_{15}$. As a result, data y stored in the Y register 132 is conducted to the buffer register 152 through the bus line $B_{23}$. Thereafter, the control signal m is delivered to the output selector 14 to open the gate $G_{13}$. The function code stored in the F register 134 is sent forth to the decoder 153 through the bus line $B_{24}$. The decoder 153 decodes the received function code. Where said function code denotes $x^y$, then the flip-flop circuit 155 is set. Where the function code represents $x^{1/y}$, then the flip-flop circuit 156 is set. Therefore, the exponent calculate module 154 is preset at the $x^y$ or $x^{1/y}$ mode. Where the control signal a is supplied to the exponential operation circuit 15, then the gates $G_4$, $G_5$ are opened, causing data x stored in the buffer register 151 and data y stored in the buffer register 152 to be delivered to the exponent calculate module 154. At this time, a start instruction is issued to said exponent calculate module 154. This exponent calculate module 154 is provided with a program designed to determine the value of $x^y$ and $x^{1/y}$. The exponential operation of $x^y$ or $x^{1/y}$ is carried out in accordance with the condition in which the flip-flop circuits 155, 156 are set, while applying a work memory 157. When the control signal g is issued from the control section 11 to the input selector 12, the data obtained from the above-mentioned exponential operation is supplied to the X register 131 of RAM 13 through the bus line $B_{26}$, gate $G_7$, and bus line $B_4$. Where the exponent calculate module 154 detects an error and the control signal f is supplied to the input selector 12, then an error data is written in the X register 131 of RAM 13 through the bus line $B_{13}$ and gate $G_6$. Where the error check step included in the step $S_{10}$ is taken, the contents of the X register 131 are judged. Where an error data is written in said X register 131, then a prescribed error display procedure is taken. Where data y denotes an integer, then judgement is made at step $S_9$ as to whether data x has a positive or negative value. The operation circuit 18 carries out this judgement from the contents of the sign flag $x_s$ stored in the X register 131. Where the contents of said sign flag $X_s$ denote such a value as is expressed by a binary code "0," that is, a positive value, then no difficulties arise. Therefore, an exponential operation is carried out at step $S_{10}$ through the same procedure as followed by the conventional exponential operation device. Where the contents of the sign flag $X_s$ denote such a value as is expressed by a binary code "1," namely where data x has a negative value, then step $S_{11}$ is commenced to judge whether data y represents an odd or even number. This judgment can be effected simply by determining whether the lowermost bit of the digit position of a mantissa of the data y indicates a binary code "1" or "0." Where the above-mentioned judgment gives an even number, then step $S_{12}$ is commenced to judge whether an instruction code stored in the F register 134 relates to $x^y$ or $x^{1/y}$. Where the instruction code is judged to denote $x^{1/y}$, then step $S_{10}$ is taken to carry out an exponential operation through the same procedure as is followed by the conventional exponential operation device. Namely, where x included in the term $x^{1/y}$ shows a negative value, and y included in said term is not an odd number, then the result of the exponential operation is regarded as an error. Where data y is judged to be an odd number at step $S_{11}$, then the control section 11 sends forth a binary code "1" to the S register 136. At step $S_{14}$, data x is read out from the X register 131 to the absolute value-forming circuit 16 to produce an absolute value. The absolute value thus formed is returned to the X register 131. Where an instruction code stored in the F register 134 is judged to represent $x^y$ at step $S_{12}$, then step $S_{14}$ is also taken. At step $S_{10}$, therefore, operation is carried out with respect to the absolute value $|x|$ of data x. Even where data x denotes a negative value, the result of said operation is not regarded as an error.

Description is not given of a procedure taken at step $S_{14}$. A control signal p is sent forth from the control section 11 to the output selector 14, causing data x stored in the X register 131 of RAM 13 to be supplied to the absolute value-forming circuit 16 through the gate $G_{16}$ and bus line $B_{10}$. Upon receipt of the control signal b, the absolute value-forming circuit 16 produces the absolute value $|x|$ of the received data x. Where the control signal h is delivered from the control section 11 to the input selector 12, then the produced absolute value $|x|$ is delivered to the X register 131 of RAM 13 through the bus line $B_{14}$ and gate $G_8$.

At step $S_{15}$ taken after completion of the above-mentioned exponential operation, the contents of the S register 136 are written in the sign digit position of the X register 131. The absolute value $|x|$ of data x formed at step $S_{14}$ can bear a negative notation in the S register 136 in which a value expressed by a binary code "1" is written at step $S_{13}$. In other cases where the S register 136 has such contents as can be expressed by a binary code "0," no difficulties arise. The result of an exponential operation written in the X register 131 is supplied to a display section (not shown) through the output selector 14 and bus line $B_9$.

What is claimed is:

1. An exponential operation device comprising:
   operation means for effecting a calculation on an exponential function represented by data items x and y;
   memory means for temporarily storing a radix data x and exponent data y on which an exponential calculation is to be performed, said memory means being coupled to said operation means for supplying the data x, y to said operation means:
   first judging means coupled to said memory means for judging whether said radix data x stored in said memory means is negative or not and for issuing a corresponding judgement signal;
   second judging means coupled to said memory means for judging whether said exponent data y stored in said memory means is an integer or not and for issuing a corresponding judgement signal; and
   control means coupled to said first judging means, to said second judging means and to said operation means for designating the execution of an exponential calculation, $x^y$, with respect to said operation means on the basis of judgement signals from said first and second judging means.

2. The exponential operation device of claim 1, further comprising absolute value producing means coupled to said memory means and to said control means for producing an absolute value $|x|$ of the data x when the data x stored in said memory means is negative; said operation means being thereby caused by said control means to perform the exponential calculation, $|x|^y$, with respect to the data $|x|$ which is output from said absolute value producing means.

3. The exponential operation device of claim 2, wherein said second judging means includes means for judging whether said data y is an even number or an odd number; and wherein when said first judging means judges that said data x is negative and said second judging means judges that said data y is an odd number, said operation means is caused by said control means to perform the exponential calculation, $|x|^y$, the result of said exponential calculation being obtained with a minus sign added to a result of the calculation, $|x|^y$.

4. The exponential operation device of any one of claims 1, 2 or 3, further comprising reciprocal forming means coupled to said memory means and to said control means for calculating the reciprocal of said data y when the data y is judged to include a radix point; said operation means being caused by said control means to effect an exponential calculation of $x^{1/y}$ when said second judging means judges that the result of the calculation by said reciprocal forming means is an integer.

5. The exponential operation device of claim 4, wherein said first judging means and said second judging means include a full adder for judging whether the data is positive or negative, an integer or not and an even number or not.

6. The exponential operation device of any one of claims 1, 2 or 3, wherein said first judging means and said second judging means include a full adder for judging whether the data is positive or negative, an integer or not and an even number or not.

7. An exponential operation device comprising:
   operation means for effecting a calculation on an exponential function represented by $x^{1/y}$;
   memory means for temporarily storing radix data x and a reciprocal of an exponent on which an exponential calculation is to be performed, said memory means being coupled to said operation means for supplying the data x and data y to said operation means;
   first judging means coupled to said memory means for judging whether the radix data x stored in said memory means is negative or not and for issuing a corresponding judgement signal;

second judging means coupled to said memory means for judging whether the data y stored in said memory means is an integer or not and if the data y is an integer, for judging whether the data y which is an integer is an odd number or an even number, and for issuing judgement signals as a result of said judging; and control means coupled to said first judging means, to said second judging means and to said operation means for designating the execution of an exponential calculation, $x^{1/y}$, with respect to said operation means on the basis of judgement signals from the first and second judging means.

8. The exponential operation device of claim 7, further comprising an absolute value producing means coupled to said memory means and to said control means for producing an absolute value x of the data x when the data x stored in the memory means is judged to be negative, said operation means performing a calculation of $|x|^{1/y}$ with respect to $|x|$ calculated by said absolute value producing means when said second judging means judges that said data y is an odd number, and providing a result of the calculation with a minus sign added to the result of $|x|^{1/y}$.

9. The exponential operation device of claim 7 or 8, further comprsing reciprocal forming means coupled to said memory means and to said control means for calculating a reciprocal, 1/y, of said data y when said second judging means judges that said data y includes a radix point; and in which said operation means is caused to perform an exponential calculation, $x^y$, when a result of the calculation by said reciprocal forming means is an integer.

10. The exponential operation device of claim 12, in which said first and second judging means include a full adder for judging whether the data is positive or negative, an integer or not and an even number or not.

11. The exponential operation device of claim 7 or 8, in which said first and second judging means include a full adder for judging whether the data is positive or negative, an integer or not and an even number or not.

* * * * *

UNITED STATES PATENT AND TRADEMARK OFFICE
CERTIFICATE OF CORRECTION

PATENT NO. : 4,410,956
DATED : October 18, 1983
INVENTOR(S) : Junichi YOSHIDA

It is certified that error appears in the above-identified patent and that said Letters Patent is hereby corrected as shown below:

Column 1, line 27, "which the above" should read --which does not have the above--;

Column 12, line 14, "of claim 12" should read --of claim 9--.

Signed and Sealed this

Thirteenth Day of March 1984

[SEAL]

Attest:

Attesting Officer

GERALD J. MOSSINGHOFF
Commissioner of Patents and Trademarks